(12) United States Patent
Bhattacharjee et al.

(10) Patent No.: US 7,928,161 B2
(45) Date of Patent: Apr. 19, 2011

(54) AQUEOUS POLYURETHANE DISPERSIONS MADE FROM HYDROXYMETHYL CONTAINING POLYESTER POLYOLS DERIVED FROM FATTY ACIDS

(75) Inventors: Debkumar Bhattacharjee, Lake Jackson, TX (US); Erdem Bedri, Midland, MI (US); Gerhard Mueller, Muenster (DE)

(73) Assignee: Dow Global Technologies LLC, Midland, MI (US)

( * ) Notice: Subject to any disclaimer, the term of this patent is extended or adjusted under 35 U.S.C. 154(b) by 70 days.

(21) Appl. No.: 11/665,097

(22) PCT Filed: Oct. 24, 2005

(86) PCT No.: PCT/US2005/038215
§ 371 (c)(1),
(2), (4) Date: Apr. 11, 2007

(87) PCT Pub. No.: WO2006/047431
PCT Pub. Date: May 4, 2006

(65) Prior Publication Data
US 2008/0097044 A1    Apr. 24, 2008

Related U.S. Application Data

(60) Provisional application No. 60/622,217, filed on Oct. 25, 2004.

(51) Int. Cl.
*C08L 75/04* (2006.01)
*C08G 18/08* (2006.01)
(52) U.S. Cl. ........ 524/837; 524/871; 525/454; 528/74.5
(58) Field of Classification Search .......... 525/454; 524/871, 839; 528/74.5
See application file for complete search history.

(56) References Cited

U.S. PATENT DOCUMENTS

| | | | |
|---|---|---|---|
| 3,427,334 A | | 2/1969 | Belner |
| 3,427,335 A | | 2/1969 | Herold |
| 4,147,679 A | * | 4/1979 | Scriven et al. ............... 523/404 |
| 4,423,162 A | * | 12/1983 | Peerman et al. ............. 521/164 |
| 4,533,254 A | | 8/1985 | Cook et al. |
| 4,534,907 A | * | 8/1985 | Peerman et al. ............. 554/213 |
| 4,543,369 A | * | 9/1985 | Peerman et al. ............. 521/137 |
| 4,561,922 A | * | 12/1985 | Peerman et al. ............. 156/331.4 |
| 4,599,401 A | | 7/1986 | Koleske |
| 4,843,054 A | | 6/1989 | Harper |
| 5,300,535 A | | 4/1994 | Takeyasu et al. |
| 5,451,631 A | | 9/1995 | Guo |
| 5,552,486 A | | 9/1996 | Guo et al. |
| 5,648,559 A | | 7/1997 | Hager |
| 5,786,514 A | | 7/1998 | Shen et al. |
| 5,811,566 A | | 9/1998 | Watabe et al. |
| 5,854,386 A | | 12/1998 | Shen et al. |
| 5,856,369 A | | 1/1999 | Jorgenson et al. |
| 6,018,017 A | | 1/2000 | Le-Khac |
| 6,075,064 A | | 6/2000 | Muller et al. |
| 6,255,537 B1 | | 7/2001 | Hayashi et al. |
| 6,355,845 B1 | | 3/2002 | Clement et al. |
| 6,429,342 B1 | | 8/2002 | Clement et al. |
| 6,552,163 B1 | | 4/2003 | Clement et al. |
| 6,762,270 B2 | | 7/2004 | Ludewig et al. |
| 2003/0225244 A1 | | 12/2003 | Nobori et al. |
| 2004/0242910 A1 | * | 12/2004 | Dwan'Isa et al. ............. 554/176 |
| 2005/0070620 A1 | * | 3/2005 | Herrington et al. ........... 521/155 |
| 2008/0096995 A1 | * | 4/2008 | Bedri et al. .................. 521/160 |
| 2010/0055471 A1 | * | 3/2010 | Fuhry ........................... 428/419 |

FOREIGN PATENT DOCUMENTS

| | | |
|---|---|---|
| CA | 2162083 | 5/1996 |
| DE | 4226243 | 2/1994 |
| EP | 139042 | 5/1985 |
| EP | 142121 | 5/1985 |
| EP | 143120 | 6/1985 |
| EP | 0397036 | 11/1990 |
| EP | 0763555 | 3/1997 |
| EP | 1112243 | 7/2001 |
| JP | HEI 5-163342 | 6/1993 |
| WO | WO-02/055576 | 7/2002 |
| WO | WO-2004/020497 | 3/2004 |
| WO | WO-2004/096744 | 11/2004 |
| WO | WO-2006/047432 | 5/2006 |
| WO | WO-2006/047433 | 5/2006 |
| WO | WO-2006/047434 | 5/2006 |
| WO | WO-2006/065345 | 6/2006 |

OTHER PUBLICATIONS

Guo et al. Journal of Polymers and the Environment, vol. 10, Nos. 1-2, 2002, pp. 49-52.*
Petrovic et al. Eur. J. Lipid Sci. Technol. 2010. vol. 112. pp. 97-102.*
U.S. Appl. No. 11/663,466, filed Mar. 22, 2007.
U.S. Appl. No. 11/663,528, filed Mar. 22, 2007.
U.S. Appl. No. 11/663,529, filed Mar. 22, 2007.
U.S. Appl. No. 11/665,119, filed Apr. 11, 2007.
T.H. Khoe, F.H. Otey and E.N. Frankei, "Rigid Urethane Foams from Hydroxymethylated Linseed Oil and Polyol Esters", Northern Regional Research Laboratory, Peoria, Illinois 61604 USA.

* cited by examiner

*Primary Examiner* — Mark Eashoo
*Assistant Examiner* — Michael A Salvitti

(57) ABSTRACT

Polymer dispersions are prepared by reaction of a polyisocyanate and a hydroxylmethyl containing polyester polyol derived from a fatty acid to form a prepolymer, dispersing the prepolymer in an aqueous phase and then curing the prepolymer to form solid particle particles. The prepolymers can be prepared having isocyanate, hydroxyl, or a variety of other reactive functional groups. The dispersions are useful in a variety of coating, sealant, adhesive and elastomer applications.

20 Claims, No Drawings

AQUEOUS POLYURETHANE DISPERSIONS MADE FROM HYDROXYMETHYL CONTAINING POLYESTER POLYOLS DERIVED FROM FATTY ACIDS

This application claims benefit of U.S. Provisional Application No. 60/622,217, filed Oct. 25, 2004.

The invention relates to dispersions of polyurethane and/or polyurea polymers in an aqueous continuous phase.

Aqueous polyurethane dispersions are used in a variety of films, coatings, adhesives and sealant applications. These dispersions are commonly prepared by forming an isocyanate-terminated prepolymer, dispersing the prepolymer in an aqueous phase, and then forming the polyurethane and/or urea polymer by chain-extending the prepolymer. The prepolymer itself is made by reacting an excess of a polyisocyanate with a polyol. Two types of polyols are commonly used. The first type is a polyether polyol, which is typically a polymer of propylene oxide or a propylene oxide/ethylene oxide mixture. The second main type of polyol is a polyester polyol, which may be a derived from a cyclic lactone such as caprolactone, or may be derived from a low molecular weight diol and a dicarboxylic acid anhydride.

These polyether and polyester polyols are almost always derived from oil, gas or coal feedstocks. As these feedstocks are not renewable, there are concerns about the depletion of the natural resources from which they are derived. In addition, geopolitical factors often make the cost of these resources unpredictable. For these reasons, there is a desire to develop polyols that are derived from renewable resources. Various types of such polyols have been developed. However, these polyols differ significantly in structure, reactivity and other characteristics from the commonly available polyether and polyester polyols, and therefore have not represented drop-in replacements for these materials in most applications. So far, polyols derived from renewable resources have found limited applications.

In the aqueous polyurethane dispersion applications, even polyether and polyester polyols have found some limitations to their use. Polyurethane coatings, films and sealants made from a polyether polyol-based dispersion tend to be degraded when exposed to light. These polyurethanes sometimes have properties inferior to those made using polyester polyols. Inferior stress crystallizability is a common example of such a property. On the other hand, polyurethanes based on polyester polyols tend to hydrolyze due to the reaction of the ester groups with water molecules in the aqueous phase of the dispersion. This reduces the polymer molecular weight and crosslink density, and causes a concomitant deterioration in the physical properties of the polymer.

Accordingly, it would be desirable to provide a dispersion of polyurethane particles in an aqueous phase, in which a significant portion of the raw materials used to make the polyurethane are derived from renewable resources. It would be further desirable that the resulting polyurethanes have good stability to light and hydrolysis, and otherwise have good physical and other properties.

This invention is a dispersion of polymer particles in a continuous aqueous phase, wherein the dispersed polyurethane particles include a polyurethane resin that is the reaction product of a polyisocyanate, at least one curing agent and at least one high equivalent material having isocyanate-reactive groups, in which the high equivalent weight material includes at least one hydroxymethyl-containing polyester polyol derived from a fatty acid.

This invention is also a method for preparing a dispersion of polyurethane particles in a continuous aqueous phase, comprising dispersing a urethane group- or urea group-containing prepolymer in an aqueous phase to form dispersed droplets containing the prepolymer, and curing the prepolymer to form solid polymer particles dispersed in the aqueous phase, wherein the prepolymer is the reaction product of reactants including a polyisocyanate and an isocyanate-reactive material, the isocyanate-reactive material including at least one high equivalent weight hydroxymethyl-containing polyester polyol derived from a fatty acid.

The high equivalent weight material suitably includes at least 10% by weight of one or more hydroxymethyl-containing polyester polyols prepared by reacting a hydroxymethyl group-containing fatty acid having from 12 to 26 carbon atoms, or an ester of such a hydroxymethyl group-containing fatty acid, with a polyol or polyamine initiator compound having an average of at least 2 hydroxyl, primary amine and/or secondary amine groups, such that the hydroxymethyl-containing polyester polyol contains an average of at least 1.3 repeating units derived from the hydroxymethyl-group-containing fatty acid or ester for each hydroxyl, primary amine and secondary amine group on the initiator compound, and the hydroxymethyl-containing polyester polyol has an equivalent weight of at least 400 up to 15,000.

Other aspects of the invention include coating, sealant or adhesive compositions containing the dispersion of the invention or made from a dispersion prepared in accordance with the invention. In still other aspects, this invention is a film, a coating, a cured sealant or a cured adhesive prepared from the dispersion of the invention or a dispersion made in accordance with the invention.

A significant proportion of the mass of the dispersed polyurethane particles is derived from renewable plant resources such as corn, soybeans and other oil-producing plants, or from animal fats. Surprisingly, the dispersions can be made easily in well-known manufacturing processes, and the polymers themselves have properties that are comparable to and in some respects better than those prepared using conventional polyether and polyester polyols. For example, the polymeric materials in some instances exhibit improved hydrolytic resistance/stability over similar materials made using conventional aliphatic polyester polyols, e.g. adipates and even caprolactone based polyester polyols. The polymeric materials often exhibit lower water absorption than similar materials made from conventional polyether polyols, making them particularly useful for applications such as waterproofing membranes, for example. The low water absorption also makes the polymeric material useful for many adhesive applications, and in general for any application in which the final product is exposed to humid conditions or direct contact with water. The polymer materials also sometimes exhibit good acid-etch resistance, which is an important parameter from a weatherability standpoint. Coatings made using the invention often exhibit good flexibility, particularly in applications where a balance of hardness and flexibility is desired.

In this invention, the term "polyurethane" is used as a shorthand for a chain-extended isocyanate-terminated prepolymer. The "polyurethane" may contain urethane linkages, urea linkages, silane, ester or other groups or, as is usual, combinations of two or more of these of these. The prepolymer itself may contain urethane or urea groups, or combinations of these even prior to chain extension.

Although not critical to the invention, the prepolymer is preferably water-dispersible. By "water-dispersible", it is meant that the prepolymer is capable of being dispersed in water to form a dispersion without significant separation of the aqueous and prepolymer phases into layers. A water-dispersible prepolymer tends to provide at least two advantages: first, it facilitates making a stable dispersion of prepolymer droplets during the dispersing step and second, it promotes the formation of smaller droplets (which also tends to improve stability). However, it is possible to achieve these properties even with a prepolymer that is not water-dispersible, using an appropriate selection of external surfactant(s) and/or costabilizer as described more fully below, or by using a continuous process.

Water dispersibility is promoted by incorporating hydrophilic groups such as poly(ethylene oxide) chains, carboxylic acid, carboxylate, phosphate, sulfonate or ammonium groups into the prepolymer structure, as discussed more fully below.

The prepolymer is preferably liquid, or a solid having a melting temperature of less than about 80° C., especially less than 50° C. Most, preferably, the prepolymer is a liquid at 22° C.

If composite polyurethane/vinyl polymer particles are to be made (as discussed more fully below), the prepolymer is also suitably soluble in the ethylenically unsaturated monomer(s) that are used.

The prepolymer contains free reactive functional groups. These may include, for example, isocyanate, hydroxyl, amino, hydrolyzable silane, ethylenic unsaturation, epoxide, carboxylic acid or carboxylic anhydride groups, for example. The prepolymer suitably has a molecular weight of no greater than about 200,000, especially no greater than about 50,000. A preferred prepolymer has a number average molecular weight from about 500, or from about 800, or from about 1,000, or from about 1,200, to about 25,000, or to about 15,000, or to about 12,000, or to about 8,000, or to about 6,000.

A preferred prepolymer contains free isocyanate groups. The isocyanate content of such a prepolymer can range very broadly, such as from 0.5 wt. % to 35 wt. % based on the total weight of the prepolymer. Optimal isocyanate contents will vary depending on the application. In general, hard, more rigid polyurethanes are made when the isocyanate content is relatively high, such as from 15 to 35 wt. %, whereas softer, less rigid polyurethanes are made when the isocyanate content is lower. A preferred isocyanate content for many applications is from 0.5 to 12 wt. %, more preferably from 1 to 10 wt. % and especially from 4 to 9 wt. %.

Another preferred prepolymer contains hydroxyl groups. Such a prepolymer can have a hydroxyl equivalent weight of from about 150 to about 8,000. Hard, more rigid polyurethanes are generally made using lower equivalent weight prepolymers, such as those having a hydroxyl equivalent weight of about 150 to about 500. More elastomeric hydroxyl-terminated prepolymers have a hydroxyl equivalent weight of from 500 to about 3000.

The prepolymer contains on average at least 1.5, preferably at least 1.8 functional groups/molecule, and may contain up to 8 or more functional groups/molecule, preferably up to 6 functional groups/molecule, more preferably up to 4 functional groups/molecule and especially up to 3 functional groups per molecule.

The viscosity of the prepolymer is suitably no greater than 50,000 cps (50 Pa·s) at 25° C., preferably no greater than 20,000 cps (20 Pa·s), especially no greater than 10,000 cps (10 Pa·s) and most preferably no greater than 1000 cps (1.0 Pa·s). This lower viscosity facilitates the control of particle size and polydispersity index (particle size distribution). If a higher viscosity prepolymer is used, it is generally desirable to dissolve the prepolymer into some suitable solvent to reduce its viscosity. Volatile solvents have the advantage of being strippable from the product dispersion so as to reduce VOCs. The solvent may perform some other useful function as well. For example, a monomeric isocyanate may be used as the solvent, in which case the monomeric isocyanate will polymerize into the dispersed polyurethane polymer. Another option is to use an ethylenically unsaturated monomer or mixture thereof as the solvent. The ethylenically unsaturated monomer can be polymerized to form composite polyurethane/vinyl polymer particles. These particles may have an interpenetrating network or core shell morphology.

The prepolymer is the reaction product of an organic polyisocyanate material and an isocyanate-reactive material having two or more isocyanate-reactive groups. In order to provide the prepolymer with free isocyanate groups, an excess of the polyisocyanate is used. Free hydroxyl groups are provided when the isocyanate-reactive material is provided in excess.

The isocyanate-reactive material includes a hydroxymethyl-containing polyester polyol derived from a fatty acid. The term "derived from a fatty acid" is used herein to refer to materials made using fatty acids or fatty acid esters as a starting material or intermediate. The hydroxymethyl-containing polyester polyol is characterized as having an average of at least one ester group per molecule and at least one hydroxymethyl (—CH$_2$OH) group per molecule. The hydroxymethyl-containing polyester polyol suitably has an average of at least 2, preferably at least 2.5, more preferably at least 2.8, to about 12, more preferably to about 6, even more preferably to about 5, hydroxyl, primary and secondary amine groups combined per molecule. The hydroxymethyl-containing polyester polyol also suitably has an equivalent weight of at least 400, such as at least about 600, at least about 650, at least about 700, or at least about 725, to about 15,000, such as to about 6000, to about 3500, up to about 1700, up to about 1300, or to about 1000. Equivalent weight is equal to the number average molecular weight of the molecule divided by the combined number of hydroxyl, primary amine and secondary amine groups.

The hydroxymethyl-containing polyester polyol is conveniently prepared by reacting a hydroxymethyl-group containing fatty acid having from 12 to 26 carbon atoms, or an ester of such a hydroxymethylated fatty acid, with a polyol, hydroxylamine or polyamine initiator compound having an average of at least 1.0 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxymethyl-group containing fatty acid or ester thereof for each hydroxyl, primary amine and secondary amine groups in the initiator compound, and the hydroxymethyl-containing polyester polyol has an equivalent weight of at least 400 up to about 15,000.

The hydroxymethyl-containing polyester polyol advantageously is a mixture of compounds having the following average structure:

(I)

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that at least some A groups are A1, A2 or A3. A1 is:

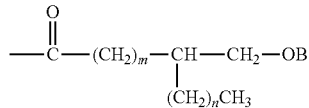
(II)

wherein B is H or a covalent bond to a carbonyl carbon atom of another A group; m is number greater than 3, n is greater than or equal to zero and m+n is from 8 to 22, especially from 11 to 19. A2 is:

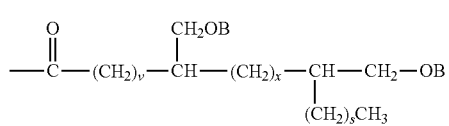
(III)

wherein B is as before, v is a number greater than 3, r and s are each numbers greater than or equal to zero with v+r+s being from 6 to 20, especially 10 to 18. A3 is:

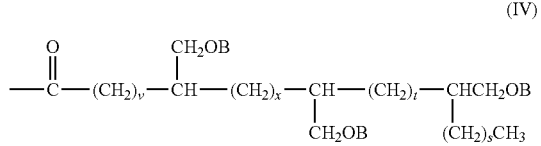
(IV)

wherein B, v, each r and s are as defined before, t is a number greater than or equal to zero, and the sum of v, r, s and t is from 5 to 18, especially from 10 to 18. A4 is

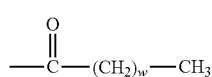
(V)

where w is from 10-24, and A5 is

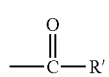
(VI)

where R' is a linear or branched alkyl group that is substituted with at least one cyclic ether group and optionally one or more hydroxyl groups or other ether groups. The cyclic ether group may be saturated or unsaturated and may contain other inert substitution. "Inertly substituted" groups are groups that do not react with an isocyanate group and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester, and the like. The hydroxyl groups may be on the alkyl chain or on the cyclic ether group, or both. The alkyl group may include a second terminal —C(O)— or —C(O)O— group through which it may bond to another initiator molecule. A5 groups in general are lactols, lactones, saturated or unsaturated cyclic ethers or dimers that are formed as impurities during the manufacture of the hydroxylmethyl-group containing fatty acid or ester. A5 groups may contain from 12 to 50 carbon atoms.

In formula I, z is preferably from 2 to 8, more preferably from 2 to 6, even more preferably from 2 to 5 and especially from about 3 to 5. Each X is preferably —O—. The total average number of A groups per hydroxymethylated polyol molecule is preferably at least 1.5 times the value of z, such from about 1.5 to about 10 times the value of z, about 2 to about 10 times the value of z or from about 2 to about 5 times the value of z.

A is preferably A1, a mixture of A1 and A2, a mixture of A1 and A4, a mixture of A1, A2 and A4, a mixture of A1, A2 and A3, or a mixture of A1, A2, A3 and A4, in each case optionally containing a quantity of A5. Mixtures of A1 and A2 preferably contain A1 and A2 groups in a mole ratio of 10:90 to 95:5, particularly from 60:40 to 90:10. Mixtures of A1 and A4 preferably contain A1 and A4 groups in a mole ratio of 99.9: 0.1 to 70:30, especially in a ratio of from 99.9:0.1 to 85:15. Mixtures of A1, A2 and A4 preferably contain from about 10 to 95 mole percent A1 groups, 5 to 90 percent A2 groups and up to about 30 percent A4 groups. More preferred mixtures of A1, A2 and A4 contain from 25 to 70 mole-% A1 groups, 15-40% A2 groups and up to 30% A4 groups. Mixtures of A1, A2 and A3 preferably contain from 30 to 80 mole-% A1, from 10 to 60% A2 and from 0.1 to 10% A3 groups. Mixtures of A1, A2, A3 and A4 groups preferably contain from 20 to 50 mole percent A1, 1 to about 65 percent A2, from 0.1 to about 10 percent A3 and up to 30 percent A4 groups. Especially preferred polyester polyols of the invention contain a mixture of from 20 to 50% A1 groups, from 20 to 50% A2 groups, 0.5 to 4% A3 groups and from 15 to 30% A4 groups. In all cases, A5 groups advantageously constitute from 0 to 7%, especially from 0 to 5%, of all A groups.

Preferred mixtures of A groups conveniently contain an average of about 0.8 to about 1.5 —CH$_2$OH and —CH$_2$OB groups/A group, such as from about 0.9 to about 1.3 —CH$_2$OH and/or —CH$_2$OB groups/A group or from about 0.95 to about 1.2 —CH$_2$OH and/or —CH$_2$OB groups/A group. Such mixtures of A groups (1) allow the initiator functionality to mainly determine the functionality of the polyester polyol and (2) tend to form less densely branched polyester polyols.

Hydroxymethyl-containing polyester polyols according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. The resulting alkyl esters may be hydrolyzed to the corresponding fatty acids if desired, but this step is usually not necessary or desirable. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in WO 04/096744. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydroxymethylated fatty acids is then reacted with an initiator compound, with removal of water or lower alkanol to form the polyester polyol.

The initiator contains at least one, preferably two or more hydroxyl, primary amine or secondary amine groups, and can be a polyol, an alkanol amine or a polyamine. Initiators of particular interest are polyols. Polyether polyol initiators are useful, including polymers of ethylene oxide and/or propylene oxide having from 2 to 8, especially from 2 to 4 hydroxyl groups/molecule and a molecular weight of from 150 to 3000, especially from 200 to 1000.

Hydroxymethyl-containing fatty acids made in the foregoing process tend to be a mixture of materials having no hydroxymethyl groups and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Methods of making such hydroxymethyl-containing polyester polyols are described in WO 04/096744.

The hydroxymethyl-containing polyester polyol so produced generally contains some unreacted initiator compound, and may contain unreacted hydroxymethylated fatty acids (or esters). Initiator compounds often react only monofunctionally or difunctionally with the fatty acids (or esters), and the resulting polyester polyol often contains free hydroxyl or amino groups bonded directly to the residue of the initiator compound.

The hydroxymethyl-containing polyester polyol may be alkoxylated, if desired, to introduce polyether chains onto one or more of the hydroxymethyl groups. The hydroxymethyl-containing polyester polyol may also be aminated through a reactive amination process The hydroxymethyl-containing polyester polyol may be blended with one or more other materials that react with isocyanate groups, including materials having one or more hydroxyl, primary amine, secondary amine or epoxide groups. These other isocyanate-reactive materials may be of various types. For example, other isocyanate-reactive materials having an equivalent weight of 400 or greater, especially from about 400 to about 8,000, or about 500 to about 3,000 or from about 600 to about 2,000 can be used. Examples of such higher equivalent weight materials include polyether polyols, polyester polyols and aminated polyethers. They typically will have a functionality (number of isocyanate-reactive groups/molecule) of about 1 to about 8, especially from about 1.8 to about 3.5. The polyethers of interest include homopolymers of propylene oxide, ethylene oxide or tetrahydrofuran, for example, and random and/or block copolymer of propylene oxide and ethylene oxide. Polyesters of interest include polylactones and butanediol/adipate polyesters.

The hydroxymethyl-containing polyester polyol may also be blended with a chain extender and or a crosslinker, as are described more fully below.

It is especially preferred to include at least one material that imparts hydrophilic characteristics to the prepolymer. Such a property tends to make the prepolymer more easily water-dispersable, which in turn facilitates the formation of fine prepolymer droplets and, ultimately, a more stable polymer dispersion. Among the materials of this type are polymers of ethylene oxide, including copolymers thereof with propylene oxide or other copolymerizable monomers thereof. The polymer containing oxyethylene units may be a homopolymer of ethylene oxide, a random copolymer of ethylene oxide and another alkylene oxide, or a block copolymer of ethylene oxide and another alkylene oxide. It advantageously contains at least one isocyanate-reactive group/molecule on average. Examples of such isocyanate-reactive polymers are (A) random copolymers of propylene oxide and ethylene oxide, in which oxyethylene units comprise from about 5 to 95, especially from 10 to 75 percent of the total weight of the copolymer; (3) poly(propylene oxide) polymers that have terminal poly(ethylene oxide) blocks that together constitute from 5 to 90, especially from 5 to 60% of the total weight of the polymer; (C) polyethers having one or more internal poly(ethylene oxide) blocks that together constitute from 5 to 80, especially from 5 to 50% of the total weight of the polyether, and (D) homopolymers of ethylene oxide.

Another especially preferred material for use in preparing the prepolymer is a hydroxy-functional carboxylic acid or salt thereof, wherein the counterion is a monovalent metal or ammonium group. The presence of carboxylate groups also tends to impart hydrophilic character to the prepolymer. This material preferably contains at least two hydroxyl groups/molecule. A commonly available material of this type is dimethylolpropionic acid (DMPA) or a salt thereof.

Other preferred materials for use in making the prepolymer are polymers of propylene oxide and polyester polyols, such as 1,4-butanediol/adipate polyester polyols.

The hydroxymethyl-containing polyester polyol will typically constitute at least 10%, at least 25%, at least at least 35%, or at least 50% of the total weight of the isocyanate-reactive materials used to make the prepolymer. The hydroxymethyl-containing polyester polyol may constitute 75% or more, 85% or more, 90% or more, 95% or more or even 100% of the total weight of the isocyanate-reactive material. For example, the hydroxymethyl-containing polyester polyol(s) may constitute from 20 to 65%, from 35 to 65%, from 35 to 100% or from 50 to 80% of the total weight of isocyanate-reactive materials.

Collectively, the isocyanate-reactive materials advantageously have an average of at least 1.5, preferably at least 1.8, isocyanate-reactive groups per molecule. They preferably have on average up to 8, more preferably up to 6, even more preferably up to 4 and especially up to 3 isocyanate-reactive groups per molecule. Individual isocyanate-reactive materials may have as few as one isocyanate-reactive group per molecule, when used with other isocyanate-reactive materials having more isocyanate-reactive groups such that the mixture on average has at least 1.5 isocyanate-reactive groups per molecule.

Organic polyisocyanates that may be used to make the prepolymer include aliphatic, cycloaliphatic, arylaliphatic aromatic isocyanates and mixtures thereof. Aromatic isocyanates, especially aromatic polyisocyanates are preferred.

Examples of suitable aromatic isocyanates include the 4,4'-, 2,4'- and 2,2'-isomers of diphenylmethane diisocyanate (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diiso-cyanate, 4,4'-diisocyanato-3,3'-dimethyldiphenyl, 3-methyldiphenyl-methane-4,4'-diisocyanate, diphenyletherdiisocyanate, 2,4,6-triisocyanatotoluene and 2,4,4'-triisocyanatodiphenylether.

Mixtures of isocyanates may be used, such as the commercially available mixtures of 2,4- and 2,6-isomers of toluene diisocyanates. A crude polyisocyanate may also be used in the practice of this invention, such as crude toluene diisocyanate obtained by the phosgenation of a mixture of toluene diamine isomers or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, 1,3- and/or 1,4-bis(isocyanatomethyl)cyclohexane (including cis- and/or trans isomers), isophorone diisocyanate, saturated analogues of the above mentioned aromatic isocyanates (such as $H_{12}MDI$) and mixtures thereof.

The prepolymer is made by mixing the polyisocyanate and the isocyanate-reactive material(s) under conditions sufficient to cause the isocyanate and isocyanate-reactive groups to react. The preparation of such prepolymers is well-known, and no particular reaction conditions are critical to this invention provided that a prepolymer is formed having functional groups as described before. Typically, the reaction is performed in the presence of a catalyst, such as (a) tertiary amines such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethyl piperazine, 1,4-diazobicyclo-2,2,2-octane, bis(dimethylaminoethyl)ether and triethylenediamine; (b) tertiary phosphines such as trialkylphosphines and dialkylbenzylphosphines; (c) chelates of various metals such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; (d) acidic metal salts of strong acids such as ferric chloride, stannic chloride, stannous chloride, antimony trichloride, bismuth nitrate and bismuth chloride; (e) strong bases such as alkali and alkaline earth metal hydroxides, alkoxides and phenoxides; (f) alcoholates and phenolates of various metals such as $Ti(OR)_4$, $Sn(OR)_4$ and $Al(OR)_3$, wherein R is alkyl or aryl, and the reaction products of the alcoholates with carboxylic acids, β-diketones and 2-(N,N-dialkylamino)alcohols; (g) salts of organic acids with a variety of metal such as alkali metals, alkaline earth metals, Al, Sn, Pb, Mn, Co, Ni and Cu, including, for example, sodium acetate, stannous octoate, stannous oleate, lead octoate and metallic driers such as manganese and cobalt naphthenate; (h) organometallic derivatives of tetravalent tin, trivalent and pentavalent As, Sb and Bi and metal carbonyls of iron and cobalt and (i) mixtures of two or more of the foregoing. Reaction temperatures of from ambient (22° C.) to 150° C. or more can be used. The prepolymer made be made neat or in a solvent if desired.

The reaction product of the polyisocyanate and isocyanate-reactive materials will in most cases contain either isocyanate groups or hydroxyl groups. Other types of functionality usually must be introduced separately. This functionality can be introduced in several ways. One approach is to chemically modify the existing functional groups to convert them to another desirable functional group. An example of this is to convert terminal isocyanate groups to urethane or urea groups by reaction with a monoalcohol or water, and the hydrolyze the urethane or urea groups to form terminal primary amino groups. A second example is to oxidize terminal hydroxyl groups to form carboxylic acid groups.

Another approach is to react the existing functional groups with a bireactive material that contains both the new functional group that is desired, and a second reactive group that will react with the existing functional group on the prepolymer to form a covalent bond.

Bireactive materials useful for imparting specialized functionality to isocyanate-terminated urethanes include hydroxyl- or amino-functional ethylenically unsaturated compounds such as hydroxyalkyl acrylates and methacrylates, aminoalkyl acrylates and methacrylates, hydroxyl-functional carboxylic acids and carboxylic acid anhydrides, hydroxyl-containing epoxide compounds such as bisphenol-A/glycidyl ether-type epoxies, hydroxyl- or amino-functional alkoxy silanes, and the like. Diamines used in excess can be used to introduce terminal amino groups to an isocyanate-terminated prepolymer.

Bireactive materials useful for imparting specialized functionality to hydroxy-terminated urethanes include ethylenically unsaturated isocyanates such as isocyanatoethylmethacrylate, ethylenically unsaturated carboxylic acids, acid halides or acid anhydrides, epoxy-functional isocyanates, carboxylic acids, acid halides or acid anhydrides, ethylenically unsaturated alkoxy silanes such as vinyl trimethoxysilane, as well as many others.

Methods of making epoxy-functional adducts from hydroxyl-functional materials are described, for example, in U.S. Pat. No. 4,599,401 and EP 139,042, EP 143,120 and EP 142,121. Those methods can be adapted to use herein. A particular method of introducing terminal alkoxysilane groups is described in U.S. Pat. No. 6,762,270.

It is further possible that the prepolymer will contain two or more different types of functional groups. Such a prepolymer is capable of engaging in multiple types of curing reactions. This is particularly true when the prepolymer contains ethylenic unsaturation. In such a case, the prepolymer advantageously contains isocyanate and/or hydroxyl groups in addition to ethylenic unsaturation. A prepolymer of that type can be cured to form dispersed polyurethane particles having ethylenic unsaturation. The polyurethane particles can undergo a secondary cure or crosslinking reaction by exposure to a source of free radicals or UV radiation.

To make the dispersion, the prepolymer is dispersed into the aqueous phase in a batch or continuous process. If the prepolymer is solid at room temperature, it may be heated to above its melting temperature in order to mix it with the prepolymer.

The prepolymer is dispersed into an aqueous phase under conditions that the prepolymer forms droplets dispersed in the aqueous phase that have an average diameter of from 2000 nm or less. Preferably, the droplets thus formed have average diameters of from 50 nm, more preferably 70 nm, to 1000 nm, more preferably 800 nm, even more preferably 500 nm and especially 250 nm. The weight of the disperse phase ("solids", after the subsequent curing reaction) may vary widely, from just above zero weight percent of the dispersion to 60% or more. The solids preferably constitute from 10%, more preferably from 20%, even more preferably from 30% to 60%, more preferably to 50% of the weight of the dispersion.

In order to produce the required droplet size, high shear mixing techniques such as homogenization or high pressure impingement mixing are useful. A suitable high shear impingement mixing device is a MICROFLUIDIZER® emulsifier, available from Microfluidics Corporation. Such a mixing device is described in U.S. Pat. No. 4,533,254. Ultrasonic mixing is also suitable. Electric dispersers and ultrasonfiers that convert electrical energy to high frequency mechanical energy can also be used. In addition, mechanical dispersing equipment, such as IKA or OMNI type mixers, may be used to disperse the prepolymer/monomer mixture in the aqueous phase. The dispersal of the prepolymer into the aqueous phase, as well as the subsequent processing steps to create the dispersed polymer particles, can be performed continuously or batch-wise.

The aqueous phase includes water. In addition, the aqueous phase may contain an external surfactant that provides stabilization for the particles. By "external", it is meant that the surfactant does not include the prepolymer or form part of the prepolymer. However, if the prepolymer contains hydrophilic groups (such as poly(oxyethylene groups), these may provide sufficient compatibility with the aqueous phase to form stable droplets. The external surfactant will contain relatively hydrophilic groups as well as relatively hydrophobic groups, and is more soluble in the aqueous phase than in the dispersed prepolymer droplets. The hydrophobic groups adsorb onto the droplets while the hydrophilic groups extend into the aqueous phase to bring about stabilization. The surfactant preferably will adsorb onto the dispersed droplets and reduce the interfacial tension between the droplets and the aqueous phase to 5 dynes/cm or below.

Among the useful surfactants are a wide range of anionic, cationic and nonionic surfactants. Anionic and nonionic surfactants are generally preferred. Anionic and cationic surfactants can be characterized generally in that they contain one or more ionic (anionic or cationic) groups and a hydrophobic group. Suitable anionic groups include carboxylate groups and sulfonate groups. Suitable cationic groups include ammonium and phosphonium groups. The hydrophobic group is preferably an aromatic group having 6 or more carbon atoms, an aliphatic group having 6 or more, preferably 8 to 30, carbon atoms, or a combination of aromatic and aliphatic groups that contain a total of from 6 to 30 carbon atoms. Preferred anionic and cationic surfactants contain at least one acyclic alkyl or alkenyl group having 6 or more carbon atoms. In addition, the anionic and cationic surfactants can contain other moieties such as oxyalkylene groups, including oxyethylene and/or oxypropylene groups. Examples of suitable anionic and cationic surfactants include sodium lauryl sulfate, linear dodecyl benzyl sulfonate, triethanolaminelauryl sulfate, sodium dodecyl diphenyl oxide disulfonate, sodium n-decyl diphenyl oxide disulfonate, sodium hexyl diphenyl oxide sulfonate, dodecyl benzene sulfonic acid, sodium or ammonium stearate, sodium abietic acid, and the like. Examples of commercially available surfactants of these types include Polystep™ A-15 and Bisfot™-100 from Stepan Chemical, Desulf™ TLS-40 from Deforest, Dowfax™ 2A1, 3B2 and C6L from The Dow Chemical Company, Emkapol™ PO-18 from Emkay, Dresinate™ TX from Hercules and Triton™ X-100, X-405 and X-165 from Dow Chemical.

Suitable nonionic surfactants include, for example, polymers of ethylene oxide and/or propylene oxide, especially polymers of ethylene oxide, that contain a hydrophobic group as described in the preceding paragraph, as well as the various organosilicone surfactants. Examples of suitable commercially available surfactants are Pluronics™ L43 and L44 surfactant, Tetronic™ 701 and 704 surfactants, all from BASF, Tween™ 20 surfactant, available from ICI, and Igepal™ CO-850 and CO-630 surfactants, available from Rhone-Poulenc.

The most preferred surfactants are alkyl sulfate and alkyl sulfonate-type anionic surfactants, and mixtures of either or both of them with a nonionic surfactant.

The surfactant is preferably added to the aqueous phase before dispersing the prepolymer.

The dispersed prepolymer is subjected to conditions under which it cures to form a high molecular weight polymer having urethane and possibly urea or other groups (depending on the curing mechanism). Curing refers to any type of reaction in which the prepolymer reacts with itself or a curing agent to form solid polymer particles dispersed in the aqueous phase. Isocyanate on the prepolymer will react with water in the aqueous phase to form urea linkages and liberate carbon dioxide. Hydrolyzable silane groups also will react with water in the aqueous phase. A certain amount of these reactions will tend to occur when the prepolymer is dispersed. Conditions can be selected which promote the water/prepolymer reaction, such as, for example, heating the dispersed prepolymer to moderately elevated temperatures (i.e., from 30 to 100° C.).

Alternatively, or in addition to curing with water, the prepolymer may be chain extended by contacting the dispersed prepolymer droplets with an added curing agent, and subjecting the resulting mixture to conditions under which the curing agent reacts with the prepolymer. The curing agent is a material other than water that has two or more groups/molecule that react with functional groups on the prepolymer. The curing in most cases will have a weight per reactive group of 400 or less, preferably 150 or less, especially 80 or less, and reacts with functional groups on prepolymer molecules to form a covalently bonded linkage between them. Suitable curing agents for use with isocyanate-functional prepolymers include polyols, alkanolamines, various hydrazines, aminoalcohols and polyamines. Hydrazines and polyamines are preferred due to their generally higher reactivity with isocyanate groups. Specific examples of useful chain extenders include ethanolamine, isopropanol amine, diethanol amine, diisopropanol amine, ethylene diamine, diethylene triamine, triethylenetetraamine, propylene diamine, butylene diamine, cyclohexylenediamine, piperazine, 2-methyl piperazine, phenylenediamine, toluene diamine, tris(2-aminoethyl) amine, 4,4-methylene-bis(2-chloroaniline), 3,3'-dichloro-4,4-diphenyldiamine, 4,4'-diphenyldiamine, 2,6-diaminopyridine, 4,4'-diamine diphenylmethane, isophorone diamine, diethyltoluene diamine, aminoethylethanolamine, adducts of diethylene triamine diethanol amine, monoethanol amine, and the like. Amines are preferred because they react rapidly with polyisocyanates and isocyanate groups generally react with amines in preference to reacting with water.

Suitable curing agents for use with hydroxy-terminated prepolymers include di- and polyisocyanate compounds as described before. Emulsified water-borne polyisocyanates are especially useful. The isocyanate-functional chain extenders and crosslinkers may include biuret, carbodiimide, urea, allophanate and/or isocyanurate linkages. Other curing agents that can be used with hydroxy-terminated prepolymers include carboxylic acid anhydrides, polycarboxylic acids, polyacid halides, and the like.

Curing agents for use with epoxide-functional prepolymers include diamine and polyamine compounds.

Photoinitiators may be used to promote the curing of prepolymers having ethylenic unsaturation, particularly those having acrylate and methacrylate groups.

If the curing agents is water-soluble, it is most preferred to add it to the aqueous phase after the prepolymer has been dispersed into it. If a water-insoluble curing agent is used, it is preferably mixed in with the prepolymer before the dispersion is made. In this case, conditions such as reduced temperatures are desirably selected to prevent premature curing.

The dispersed prepolymer is then subjected to conditions sufficient to cure the prepolymer. Such conditions generally include an elevated temperature, such as from 35 to 150° C., more preferably from 70-130° C., although primary amine curing agents often will react quickly enough with isocyanate groups even at room temperature (22° C.). The dispersion is usually mixed during the chain extension process in order to prevent the prepolymer droplets from coagulating, to facilitate heat transfer and, when the curing agent is added during the polymerization, facilitating material transfer as well.

A catalyst for the curing reaction can be used if desired, but it is usually not necessary, particularly when the curing reaction is an amine-isocyanate reaction. Suitable catalysts for reactions of isocyanates with curing agents include the well-known urethane catalysts, such as tertiary amines, organo-tin, -mercury, -iron, -lead, -bismuth and -zinc compounds, among others. Various transesterification catalysts can be used to cure hydroxyl-terminated prepolymers with carboxylic acid, carboxylic acid anhydride or carboxylic acid halide curing agents. Similarly, well-known epoxy resin curing catalysts can be used when the prepolymer is epoxide terminated.

As the curing reaction becomes completed, the dispersed droplets form solid polymer particles that remain dispersed in the aqueous phase. Particle size generally is in the range described before with respect to the size of the dispersed prepolymer droplets, but sometimes particle re-nucleation and/or coagulation can occur during the manufacturing process, skewing the average particle size upwardly or downwardly, or in some cases forming a multimodal particle size distribution including a fraction of very fine particles.

The dispersion may also contain other ingredients, such as solvents and the like, but these ingredients, particularly volatile organic solvents, are preferably omitted. The dispersion of the invention can also be blended with other aqueous dispersions, including aqueous dispersions of epoxies, vinyl ester, polyolefin, other polyurethane, acrylate and styrene-butadiene resins.

Another optional ingredient of significance is one or more ethylenically unsaturated monomers. These monomers can be blended with the prepolymer, with the resulting blend being dispersed together within the aqueous phase. At least one of the ethylenically unsaturated monomers is a liquid or solid at room temperature, and is most preferably a liquid at room temperature. The monomer is a preferably a solvent for the prepolymer at the relative proportions that are mixed together to form the dispersion. Preferably, the monomer(s) are substantially insoluble in water, i.e., are soluble to an extent of less than 10 grams, preferably less than 5 grams, more preferably less than 2 grams, especially less than 1 gram, of monomer per 100 grams of water at 25° C. More highly water-soluble monomers can be used, especially if they form oligomers (containing up to 10 repeating units) that are substantially water-insoluble. However, the use of more highly water-soluble monomers is less preferred. When monomers that are relatively soluble in water are used, it is sometimes necessary to use a more hydrophilic prepolymer and/or employ additional stability additives (such as a costabilizer as discussed below) in order to keep the monomers dispersed in the prepolymer droplets.

Suitable monomers include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene, ar-bromostyrene, dibromostyrene, tribromostyrene, 2,5-dichlorostyrene, bromostyrene, fluorostyrene and trifluoromethylstyrene; α,β-ethylenically unsaturated carboxylic acids and esters thereof, including itaconic acid, acrylic acid, methacrylic acid, and acrylic and methacrylic esters such as methyl methacrylate, ethyl acrylate, 2-hydroxyethyl acrylate, 2-hydroxyethylmethacrylate, n-butyl acrylate, t-butyl acrylate, n-butyl methacrylate, t-butyl methacrylate, n-hexyl acrylate, maleic anhydride and the like; α,β-ethylenically unsaturated nitriles and amides such as acrylonitrile, methacrylonitrile, acrylamide, methacrylamide, N,N-dimethylacrylamide, N-(dimethylaminomethyl)acrylamide and the like, vinyl esters such as vinyl acetate; vinyl ethers; vinyl ketones; vinyl and vinylidene halides such as vinylidene chloride and vinyl chloride; maleimide, N-arylmaleimide, and N-alkymaleimides such as maleimide and N-ethyl maleimide, 1-vinyl-2-pyrrolidinone and vinyl pyridine. Mixtures of two or more of the aforementioned monomers are also suitable in making the copolymer. Among these, the monovinyl aromatic and acrylic or methacrylic esters are preferred.

Monomers containing more than one site of polymerizable carbon-carbon unsaturation can be used if desired to form a crosslinked polymer. Such monomers will typically constitute no more than about 10 mol-%, preferably from about 0.25-5 mol-%, of total monomers. Except when a conjugated diene monomer is used, it is most preferred not to use a crosslinking monomer. In addition, ethylenically unsaturated monomers containing other functional groups that also can react form a covalent bond to the prepolymer. Suitable monomers of this type will include one site of polymerizable carbon-carbon unsaturation and an isocyanate-reactive group such as a hydroxyl group, an epoxide or a primary or secondary amino group. Among the monomers of this type are 2-hydroxyethyl methacrylate, 2-hydroxyethyl acrylate, 2-hydroxybutyl methacrylate, allyl alcohol, glycidyl methacrylate, diaminoethyl methacrylate, and the like.

If additional ethylenically unsaturated monomers are used, the weight ratio of prepolymer to monomers may range from 10:90, preferably from 30:70, more preferably from 40:60 to 90:10, preferably to 80:20 and most preferably to 75:25.

Monomers that are low-boiling or gaseous at room temperature (such as isoprene and butadiene) are conveniently added to an already-formed dispersion of the prepolymer/monomer mixture, before conducting the chain extension and polymerization step. To use such monomers, a pressure vessel is conveniently charged with the dispersion of the prepolymer/monomer mixture in the aqueous phase, and the vessel is pressurized with the gaseous monomer. The contents of the pressure vessel are then held, optionally with agitation, until the desired quantity of the gaseous monomer becomes dissolved in the dispersion. Because the gaseous monomer is typically hydrophobic, it will migrate through the aqueous phase and into the prepolymer/monomer particles. In this way, particle size is set before polymerization occurs. The subsequent polymerization in this case is likewise conducted under pressure.

When an ethylenically unsaturated monomer is present, a free radical initiator is conveniently provided to promote the polymerization of the monomer to form a vinyl polymer. The initiator is preferably one that preferentially partitions into the organic (prepolymer/monomer) phase, i.e., is not substantially soluble in the aqueous phase. The use of initiators of this type tends to minimize polymerization in the aqueous phase. However, water-soluble initiators can be used, it being believed that in most instances aqueous phase polymerization will create oligomeric species that partition into the organic phase where further polymerization proceeds. Among the useful initiators are free-radical initiators such as peroxy compounds and azo compounds. Redox systems that include reducing agents and oxidizing agents are also useful. Among the useful initiators are organic peroxides such as di-t-butyl peroxide, t-butylhydroperoxide, lauryl peroxide, dichlorobenzoyl peroxide, cumene hydroperoxide and the like; hydrogen peroxide, peroxycarbonates such as diisopropyl peroxydicarbonate, dicyclohexyl peroxy dicarbonate and the like, sulfonyl peroxides such as acetyl cyclohexyl sulfonyl peracetate, sulfonylhydrazides, azo compounds such as 2,2'-azobis(2,4-dimethylpentanenitrile) and 2,2'-azobis)2-methylpropanenitrile (AIBN), 2,2-azobis(isobutyronitrile) t-butylhydroperoxide, inorganic peroxides such as ammonium peroxydisulfate, and potassium peroxy disulfate, sodium metabisulfite/ferrous ammonium sulfate and the like. Among these, the oil-soluble ones (i.e., those that are more soluble in the droplets than the aqueous phase) are most preferred. A controlled living free radical polymerization where a metal containing initiator, 2,2,6,6-tetramethylene piperadine-1-oxy (TEMPO), is used is also suitable. Such initiators, although often water-soluble, can be emulsified into the prepolymer/monomer mixture. This last type of polymerization allows for particularly good control of polymer molecular weight.

The amount of initiator is selected to provide a controlled reaction that proceeds at an economically attractive rate. The precise amounts will vary somewhat with the particular initiator, but in general 0.05 to 5% by weight based on monomers is sufficient. The initiator is preferably blended into the prepolymer/monomer mixture before it is dispersed into the aqueous phase. Generally, premature polymerization can be controlled by maintaining the temperature below that at which the initiator generates significant quantities of free radicals.

To provide further particle stability, a costabilizer may be used, especially when ethylenically unsaturated monomers are present. As used herein, a costabilizer is a material other than a prepolymer or ethylenically unsaturated monomer, which has a molecular weight below 300, preferably below 200, and is soluble in water to the extent of about $10^{-5}$ g/liter or less at 25° C. The costabilizer is believed to promote the absorption of surfactant at the water/droplet interface, thus enhancing the stability of the dispersion. Among the suitable costabilizers are alkanes and alkanols, each having from about 6 to 30 carbon atoms. Preferred alkane costabilizers include straight-chain alkanes having from 8 to 18, especially from about 10 to about 16 carbon atoms. Hexadecane is especially preferred. Among the preferred alkanol stabilizers are straight chain alcohols having from 8 to 22 carbon atoms, especially 12-20 carbon atoms.

Although the amount of external surfactant and costabilizer used will depend somewhat on the particular system, in general from 0.1 to 5 parts by weight of surfactant are used, per 100 parts by weight of the dispersion. If used, costabilizers generally constitute from 0.1 to 3 percent of the total weight of the dispersion.

The costabilizer, when used, can be added either to the aqueous phase or the prepolymer before adding the ethylenically unsaturated monomer.

It is generally preferred to cure the prepolymer simultaneously with the polymerization of the ethylenically unsaturated monomer(s), although these can be done sequentially if desired. Simultaneous polymerization and curing is achieved by adding both the curing agent and free radical initiator to the dispersed prepolymer, and subjecting the mixture to conditions at which both reactions will occur. In many cases, at least some of the resulting polymer particles are hybrid particles containing both polyurethane and vinyl polymers. The polymers may take the form of an interpenetrating polymer network or assume a core-shell morphology. Techniques that favor the formation of core-shell particles are described, for example, in WO 02/055576A2.

The resulting dispersion is useful in various applications. It is useful in making a variety of films and coatings. To this end, the dispersion can be blended with a variety of types of useful additives, including, for example, pigments, dyes, fillers, dryers, rheological and viscosity modifiers, dispersants, surfactants, preservatives, antimicrobials, pesticides, fertilizers and the like. The formulated dispersion can be applied to any number of types of substrates.

Films can be made by coagulation processes or by simple casting and drying, using techniques that are well known in the art. Similarly, coatings are readily prepared by forming a layer of the dispersion on a substrate and drying and/or coagulating the polymer particles to form a continuous coating.

The dispersion is also useful for making cast articles, particularly thin-walled articles such as gloves, including medical or surgical gloves, condoms, and the like. If desired, the dispersion can be formulated with various types of additives, such as those described before. The casting process typically includes applying the formulated dispersion to a suitable form and allowing the aqueous phase to evaporate so that the individual polymer particles coalesce to form a film over the form. Drying can be done at ambient or elevated temperature. To increase thickness, the casting process can be repeated as necessary.

The following examples are provided to illustrate the invention, but are not intended to limit the scope thereof. All parts and percentages are by weight unless otherwise indicated.

EXAMPLES 1-5

A series of isocyanate-terminated prepolymers are made from the following ingredients:

| Sample | Comp. Sample A | Comp. Sample B | Comp. Sample C | Ex. 1 | Ex. 2 | Ex. 3 | Ex. 4 | Ex. 5 |
|---|---|---|---|---|---|---|---|---|
| Polyether Polyol A | 61.7 | | | | | | | |
| Polyether Polyol B | | 64.4 | | | | | | |
| Polyester Polyol A | | | 63.9 | | | | | |
| HMPP A | | | | 69.3 | | 64 | | |
| HMPP B | | | | | 71.80 | | | |
| HMPP C | | | | | | | 63.3 | 59 |
| Poly (EO) A | 3.5 | 3.5 | 3 | 3.0 | 3.0 | 3 | 3 | |
| Poly (EO) B | 1.8 | 2 | | 1.5 | 1.5 | — | | |
| DMPA | | | | | | | | 3.5 |
| Aromatic Isocyanate A | 31 | 28 | | 26.2 | 23.7 | — | | |
| Aliphatic Isocyanate A | | | 33.1 | | | 33 | 33.7 | 37.5 |
| % NCO (wt %) | 6.0 | 6.0 | 5.0 | 5.53 | 5.54 | 5.5 | 5.5 | 5.0 |
| Viscosity (40 C., cps) | 6003 | 6098 | 53,260 | 6900 | 10,780 | 9700 | 53,000 | 14,080 |

Polyether Polyol A is an ethylene oxide-capped polypropylene oxide), available commercially as Voranol™ 9287 polyol from Dow Chemical. It has a hydroxyl equivalent weight of about 2000. Polyether Polyol B is an ethylene oxide-capped poly(propylene oxide), available commercially as Voranol™ 4701 polyol from Dow Chemical. It has a hydroxyl equivalent weight of about 1600. Polyester Polyol A is a polycaprolactone diol having a number average molecular weight of about 850. It is sold commercially by Dow Chemical as Tone™ 0210 polyol. HMPP A is a hydroxymethyl-containing polyester polyol having a hydroxyl equivalent weight of about 1000. It is the reaction product of methyl (9,10)-hydroxylmethyl stearate and a difunctional initiator. It has a functionality of about 2.0. HMPP B is a hydroxymethyl-containing polyester polyol having a hydroxyl equivalent weight of about 1600 and a hydroxyl functionality of about 3. HMPP C is a hydroxylmethyl-containing polyester polyol having an equivalent weight of about 420 and a functionality of about 2.0. It is a reaction product of methyl (9,10)-hydroxymethyl stearate and cyclohexane dimethylol. Poly (EO) A is a 1000 molecular weight poly(ethylene oxide) diol. Poly(EO) B is a 950 molecular weight poly(ethylene oxide) monol. DMPA is dimethylolpropionic acid. Aromatic Isocyanate A is a mixture containing 4,4-diphenylmethane diisocyanate as a main component and a small quantity of 2,4'-diphenylmethane diisocyanate. Aliphatic Isocyanate A is isophorone diisocyanate.

All prepolymers except for Example 5 are prepared by charging the polyol, poly(EO) and isocyanate to a stirred reactor. The reactor is purged with dry nitrogen and kept at 60° C. for 10-15 minutes. Enough benzoyl chloride is added to neutralize the basicity of polyols if needed. The reactor is then heated at 70 to 90° C. until the desired level of conversion is attained (~2-4 hours). Prepolymers are characterized by their % NCO content according to ASTM method D5155-96. The viscosities of the resulting prepolymers are then measured using a Brookfield LVF viscometer at 40° C. according to ASTM D 4878-88.

Prepolymer Example 5 is made in the same manner, except N-methyl pyrrolidone (NMP) is used as a solvent to facilitate the solution of the DMPA into the other components and reduce the viscosity of the resulting prepolymer. In addition, the prepolymer is neutralized with triethyl amine during the chain-extension step to convert approximately 90% of the carboxylic acid groups of the dimethylolpropionic acid to carboxylate groups.

Dispersions are prepared from each of the foregoing prepolymers by continuously feeding the prepolymer into a high shear mixer at a constant rate. A predetermined amount of surfactant is merged with a chilled (10-15° C.) deionized water stream (initial aqueous) at a constant rate and fed into the mixer where the prepolymer is emulsified to form a first stage emulsion containing ~75-85 wt % of the prepolymer. The high concentration dispersion exiting the IKA mixer first stage emulsion is continuously passed into a second mixer where it is diluted with an aqueous chain extender solution. The product is collected in an oversized container to allow $CO_2$ gas (which evolves from reaction of the excess isocyanate groups with water) to be released.

The viscosities of each dispersion are measured at room temperature using a Brookfield viscometer. The solids content is in each case about 54-58 wt %, as measured by an IR-200 Moisture Analyzer (Denver Instrument Company). The solids are calculated using this instrument by removing the volatile aqueous phase followed by a gravimetric determination of the amount of non-volatile dispersed polymer phase that remains. The particle size of the dispersions ranges from 0.08 to 1.0 micrometer, as determined by dynamic light scattering techniques using a Coulter LS 230 apparatus. Shear stabilities of the dispersions are measured by using a Hamilton beach mixer and AR2000 Rheometer, supplied by TA Instruments.

Coatings are prepared from each of the dispersions by drawing them down on polished and dried cold rolled steel panels using a #60 wire wound rod to achieve a target dry film thickness between 1.5 to 2.0 mils. The wet coating films are allowed to dry at room temperature for 30 minutes and then forced dried in an oven at 80° C. for 120 minutes.

EXAMPLE 6 AND COMPARATIVE SAMPLE D

A hydroxymethyl-containing polyester polyol is prepared by charging 330.4 grams of methyl (9,10)-hydroxymethyl-stearate, 72.4 grams of an approximately 1:1 mixture of 1,3 and 1,4-cyclohexanedimethanol, and 0.411 grams of dibutyl-tin oxide catalyst to a 500 milliliter five-neck round bottom glass flask equipped with a mechanical stirrer, condenser, addition funnel, nitrogen inlet, and a sensor to monitor/control reaction temperature. The mixture is heated to 150° C. with stirring using an external hot oil bath and maintained at that temperature for one hour. The temperature is then raised in 10° C. increments every 45 minutes until a final reaction temperature of 200° C. is obtained. A total of 30 grams of methanol are collected (90% of theoretical production) and the resulting hydroxymethyl-containing polyester polyol is collected. It has a hydroxyl equivalent weight of about 400.

78.15 grams of the hydroxymethyl-containing polyol, 8.21 grams of dimethylolpropionic acid, 49.14 grams of NMP, and 0.0882 grams of dibutyl tin dilaurate catalyst are added to a 250 milliliter five-neck round bottom glass flask equipped with a mechanical stirrer, addition funnel, nitrogen inlet, and a Therm-O-Watch sensor to monitor/control reaction temperature. The mixture is heated to 80° C. with stirring using an external hot oil bath. Nitrogen is sparged through the solution for two hours until the concentration of water is measured to be below 200 ppm. The reactor contents are then cooled to 75° C. 58.82 grams of isophorone diisocyanate are slowly added to the reaction mixture at such a rate that the reaction temperature is maintained at about 75° C. After all the isocyanate is added, the reaction temperature is increased to about 83° C. and maintained at that temperature for 3 hours. 4.67 grams of triethylamine are added and the temperature maintained at about 83° C. for an additional 20 minutes. The reactor contents are then cooled to 60° C. and a total of 166.7 grams of the reaction mixture are added to an 8 ounce glass bottle containing 112.3 grams of deionized water under high speed agitation. 5.07 grams of ethylene diamine in 55 grams of deionized water are then added to the aqueous dispersion and high speed agitation is maintained for an additional 20 minutes to produce dispersion Example 6.

Comparative Dispersion Sample D is prepared in a similar manner using 67.47 grams of a polycaprolactone diol (Tone® 210, from Dow Chemical) 6.75 grams of dimethylolpropionic acid, 41.45 grams of NMP, 45.17 grams of isophorone diisocyanate and 0.0767 grams of dibutyl tin dilaurate to form the prepolymer; 3.78 grams of triethylamine to neutralize the carboxylate groups supplied by the DMPA; and 4.10 grams of ethylene diamine to chain extend the prepolymer.

Dispersion Example 6 and Comparative Sample D are each drawn down into films as described with respect to Examples 1-5. The oven-cured coatings are allowed to stand for 24 hours before their physical properties are measured. Film thickness is determined according to ASTM D 1186. Gloss measurements are made using a BYK Labotron Gloss Unit in accordance with ASTM D 526. Impact resistance is determined using a Gardner Impact Tester and following ASTM D 2794. Abrasion resistance is evaluated using a Taber abrader with CS-17 wheels, 1000 g weights and 500 cycles. Pencil hardness is determined in accordance with ASTM 3 3363. Acid etch resistance is determined by placing drops of a 10% solution of sulfuric acid on the coatings for 60 hours and observing the visual effect on the film. A whitening of the coating surface indicates moderate etch and severe etch is indicated by a blistered coating surface. Water resistance is evaluated in a similar way, using deionized water. Solvent resistance of the coating is reported as the number of methyl ethyl ketone (MEK) rubs that are required to cut through the coating to the substrate. Results are as indicated in the following table.

| Properties | Example 6 | Comparative Sample D |
|---|---|---|
| Solids (wt. %) | 38.5 | 34.2 |
| Viscosity (cps) | 100 | 20 |
| Particle Size (microns) | 0.064 | 0.129 |
| Pencil Hardness | 2H | 2H |
| Impact Resistance - Direct/Reverse | 200/200 | 200/200 |
| Gloss - 20°/60° | 78/87 | 79/87 |
| Abrasion Resistance | 8.1 | 5.7 |
| Solvent Resistance | 85 | 60 |
| Water Resistance | No Effect | Slight Effect |
| Acid Etch Resistance | No Effect | Severe Effect |

The coating made using dispersion Example 6 has excellent toughness (balance of hardness and flexibility), good appearance (high gloss), and excellent abrasion resistance, as does the coating made from Comparative Sample D. The water and solvent resistance of the coatings made from dispersion Example 6 are superior relative to Comparative Sample D.

What is claimed is:

1. A dispersion of polymer particles in a continuous aqueous phase, wherein the dispersed particles include a polyurethane resin that is the reaction product of a polyisocyanate, at least one curing agent, and at least one high equivalent weight material having isocyanate-reactive groups, in which the high equivalent weight material includes at least one hydroxymethyl-containing polyester polyol derived from a fatty acid, wherein the hydroxymethyl-containing polyester polyol has the following average structure:

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that at least some A groups are A1, A2 or A3, wherein A1 is:

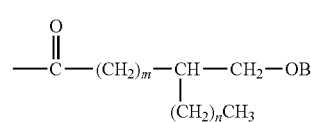

wherein B is H or a covalent bond to a carbonyl carbon atom of another A group; m is number greater than 3, n is greater than or equal to zero and m+n is from 11 to 19, and wherein A1 is from 30 to 80 mole-% of A; A2 is:

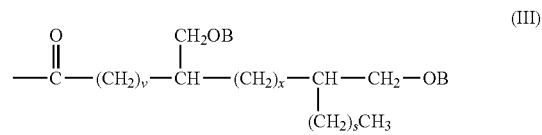

wherein B is as before, v is a number greater than 3, r and s are each numbers greater than or equal to zero with v+r+s being from 10 to 18, and wherein A2 is from 10 to 60 mole-% of A; A3 is:

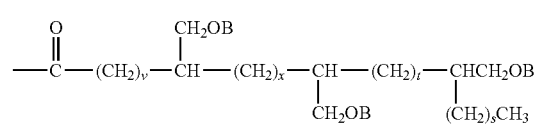

wherein B, v, each r and s are as defined before, t is a number greater than or equal to zero, and the sum of v, r, s and t is from 10 to 18, and wherein A3 is from 0.1 to 10 mole-% of A; A4 is

where w is from 10-24: and A5 is

where R' is a linear or branched alkyl group that is substituted with at least one cyclic ether group and optionally one or more hydroxyl groups or other ether groups.

2. The dispersion of claim 1, wherein the polymer particles contain ethylenically unsaturated groups.

3. The dispersion of claim 2, wherein the polymer particles are UV curable.

4. The dispersion of claim 1, wherein the polymer particles contain silyl groups.

5. The dispersion of claim 1, wherein the polymer particles contain carboxylic acid, carboxylic acid salt, sulfonate or quaternary ammonium groups.

6. The dispersion of claim 1, wherein the polymer particles contain a poly(ethylene oxide) block.

7. The dispersion of claim 1, wherein the polymer particles contain at least one group derived from a polyether polyol, a polyester polyol or a polycarbonate polyol.

8. The dispersion of claim 1, which contains at least one additive selected from the group consisting of surfactants, catalysts, pigments, dyes, fillers, dryers, rheological and viscosity modifiers, dispersants, surfactants, preservatives, antimicrobials, pesticides, and fertilizers.

9. An adhesive, sealant or coating composition comprising the dispersion of claim 1.

10. A method for preparing a dispersion of polymer particles in a continuous aqueous phase, comprising dispersing a urethane group-containing prepolymer in an aqueous phase to form dispersed droplets containing the prepolymer, and curing the prepolymer to form solid polymer particles dispersed in the aqueous phase, wherein the prepolymer is the reaction product of reactants including a polyisocyanate and an isocyanate-reactive material, the isocyanate-reactive material including at least one high equivalent weight hydroxymethyl-containing polyester polyol derived from a fatty acid, wherein the hydroxymethyl-containing polyester polyol has the following average structure:

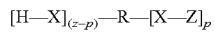  (I)

wherein R is the residue of an initiator compound having z hydroxyl and/or primary or secondary amine groups, where z is at least two; each X is independently —O—, —NH— or —NR'— in which R' is an inertly substituted alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that at least some A groups are A1, A2 or A3, wherein A1 is:

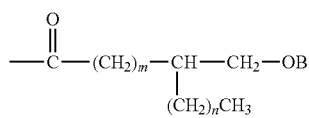  (II)

wherein B is H or a covalent bond to a carbonyl carbon atom of another A group; m is number greater than 3, n is greater than or equal to zero and m+n is from 11 to 19, and wherein A1 is from 30 to 80 mole-% of A; A2 is:

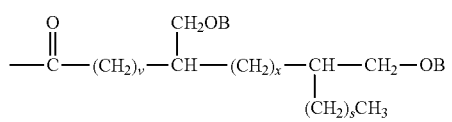  (III)

wherein B is as before, v is a number greater than 3, r and s are each numbers greater than or equal to zero with v+r+s being from 10 to 18, and wherein A2 is from 10 to 60 mole-% of A; A3 is:

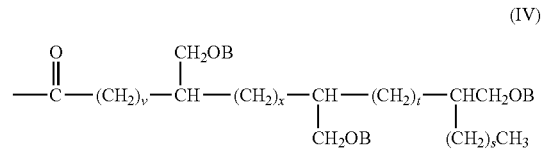  (IV)

wherein B, v, each r and s are as defined before, t is a number greater than or equal to zero, and the sum of v, r, s and t is from 10 to 18, and wherein A3 is from 0.1 to 10 mole-% of A; A4 is

  (V)

where w is from 10-24, and A5 is

  (VI)

where R' is a linear or branched alkyl group that is substituted with at least one cyclic ether group and optionally one or more hydroxyl groups or other ether groups.

11. The method of claim 10, wherein the prepolymer contains isocyanate groups.

12. The method of claim 11, wherein the prepolymer is cured by a reaction with water or a curing agent containing amine groups.

13. The method of claim 10, wherein the prepolymer contains hydroxyl groups.

14. The method of claim 13, wherein the prepolymer is cured by reaction with a curing agent containing isocyanate, carboxylic acid, carboxylic acid halide, or carboxylic acid anhydride groups.

15. The method of claim 10, wherein the prepolymer contains epoxide groups.

16. The method of claim 10, wherein the prepolymer contains ethylenically unsaturated groups.

17. The method of claim 16, wherein the prepolymer is cured in a free radical polymerization of the ethylenically unsaturated groups.

18. The method of claim 17, wherein the prepolymer is cured by exposure to UV radiation.

19. The method of claim 10, wherein the prepolymer contains both isocyanate groups and ethylenically unsaturated groups.

20. The method of claim 19, wherein the prepolymer is cured by reaction with water or a curing agent having amine groups, to form solid dispersed polymer particles having ethylenically unsaturated groups.

* * * * *